United States Patent [19]

Barma

[11] Patent Number: 4,858,337
[45] Date of Patent: Aug. 22, 1989

[54] VULCANIZED RUBBER FOOTWEAR PRODUCT

[75] Inventor: Tarachand S. Barma, La Crosse, Wis.

[73] Assignee: La Crosse Footwear, Inc., La Crosse, Wis.

[21] Appl. No.: 114,604

[22] Filed: Oct. 30, 1987

Related U.S. Application Data

[62] Division of Ser. No. 784,309, Oct. 4, 1985, Pat. No. 4,703,533.

[51] Int. Cl.⁴ .......................... A43B 1/12; A43B 1/10; A43B 13/12
[52] U.S. Cl. .......................................... 36/4; 36/30 R; 36/14
[58] Field of Search .......... 12/142 E, 142 EV, 142 T; 36/4, 7.3, 14, 17 R, 78, 15; 264/244

[56] References Cited

U.S. PATENT DOCUMENTS

| | | | |
|---|---|---|---|
| 822,692 | 6/1906 | Schaffer | 36/4 |
| 992,515 | 5/1911 | Mulconroy et al. | 36/4 |
| 2,317,879 | 4/1943 | Bingham, Jr. | 36/4 |
| 2,317,880 | 4/1943 | Bingham, Jr. | 36/4 |
| 2,546,553 | 3/1951 | Majtner | 36/78 |
| 2,742,389 | 4/1956 | Riley et al. | 36/4 |
| 2,983,643 | 5/1961 | Seiberling | 154/139 |
| 3,271,887 | 9/1966 | Werman | 35/14 |
| 3,273,263 | 9/1966 | Kilma | 36/2.5 |
| 3,742,623 | 7/1973 | Groothaert | 36/4 |
| 4,130,947 | 12/1978 | Denn | 36/30 R |
| 4,228,600 | 10/1980 | Krug et al. | 36/30 R |
| 4,245,406 | 5/1979 | Landay et al. | 36/30 R |
| 4,366,634 | 1/1983 | Giese et al. | 36/114 |
| 4,455,765 | 6/1984 | Sjosward | 36/30 R |

FOREIGN PATENT DOCUMENTS

| | | |
|---|---|---|
| 075861 | 4/1983 | European Pat. Off. . |
| 375792 | 10/1939 | Italy ................... 12/142 E |
| 537561 | 6/1941 | United Kingdom ......... 12/142 E |

*Primary Examiner*—Steven N. Meyers
*Attorney, Agent, or Firm*—Foley & Lardner

[57] ABSTRACT

The present invention provides a rubber footwear vulcanizate to which an outsole may be separately affixed. The vulcanizate may be suitably manufactured from an assembly of an uncured rubber upper insole, welt and a vulcanized midsole. The inner and outer surfaces of the midsole may be suitably roughened, and the surface thereof which interfaces the uncured assembly may be precoated with an uncured rubber. The assembled uncured rubber footwear components may be vulcanized into a footwear product of unitary construction. The outer midsole surface permits a wide variety of outer soles of different compositions to be separately secured thereto.

17 Claims, 3 Drawing Sheets

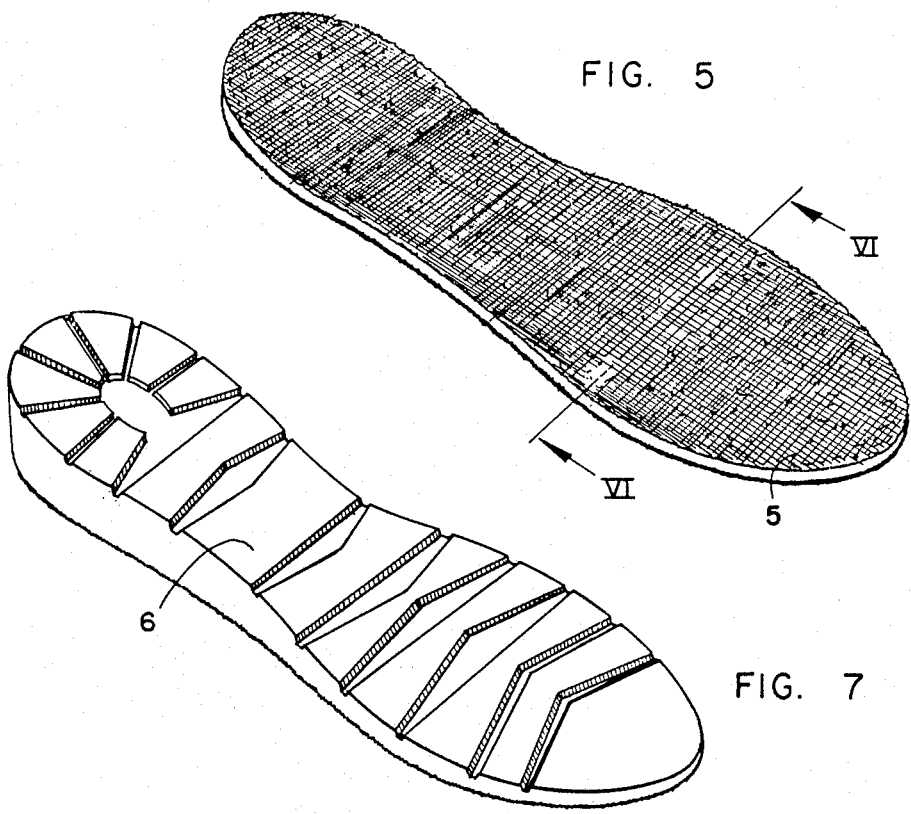
FIG. 5
FIG. 7
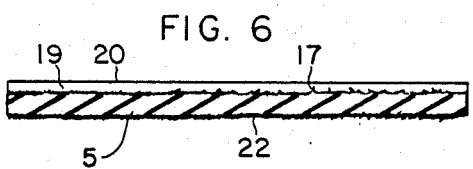
FIG. 6
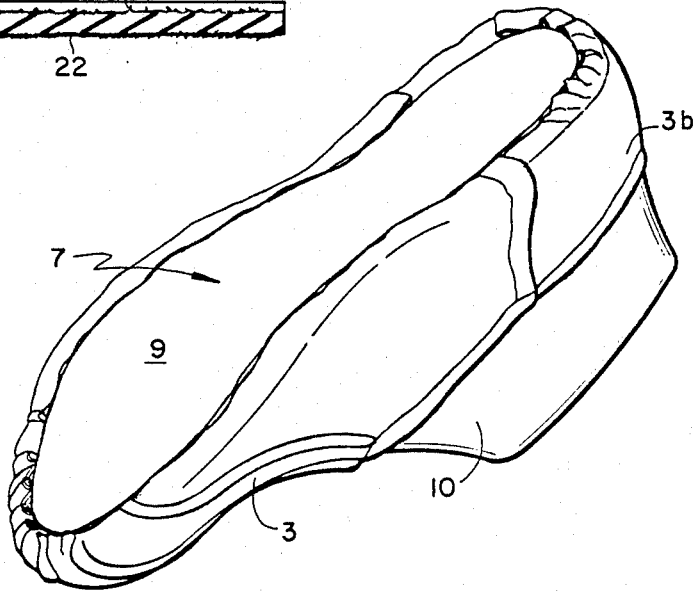
FIG. 8

VULCANIZED RUBBER FOOTWEAR PRODUCT

This application is a divisional application of U.S. patent application Ser. No. 784,309 filed Oct. 4, 1985 and entitled Rubber Footwear Vulcanizate Assembly And Its Manufacture, now U.S. Pat. No. 4,703,533.

FIELD OF THE INVENTION

This invention relates to rubber footwear products and the manufacture thereof, and more particularly to the manufacture of rubber footwear products comprising a vulcanized assembly made from an uncured rubber upper, insole, and midsole, in combination with an outsole separately affixed to the midsole of the vulcanized assembly.

BACKGROUND OF THE INVENTION

In the conventional manufacture of rubber footwear products, uncured rubber or rubber coated fabrics are typically milled or extruded into appropriate thicknesses from which the desired sized component parts for the footwear product are cut. The uncured components are normally assembled upon a forming device such as a metal last. The metal last bears the internal shape and size of the desired footwear product. The last is normally a heat conductive metal form such as a hollowed, shoe or boot-shaped aluminum form. It is conventional to assemble on the forming last an uncured rubber upper, an uncured rubber insole, an uncured foxing band (e.g. a flat uncured strip), an uncured rubber binder (e.g. uncured sheeting stock or filler) and a precured rubber sole, which has been coated upon the forming last, to form a footwear assembly. This completed footwear assembly is then vulcanized to provide the desired rubber footwear vulcanized product.

An uncured, rubber shoe or boot upper is typically positioned to adhesively overlap the insole upon the last. An uncured foxing band or flat band (e.g. 1-2 inches in width) is then placed around the outer periphery or rim of the rubber upper. An uncured binder or filler is then placed onto the insole. The binder or filler will not normally extend beyond the exposed surface of the insole. An uncured rubber outsole is then wrapped over the projecting edge of the insole onto the uncured rubber upper above the feather line. This uncured rubber assembly, which has the appearance of crude footwear, is then vulcanized upon the last, typically for about 1 to 2 hours at temperatures ranging from about 250°-350° F., to provide the vulcanized product. The component parts are thereby chemically and physically melded into a complete vulcanized footwear product of unitary construction.

Uncured (unvulcanized) natural or synthetic rubber footwear components normally possess sufficient tack for assembly upon the forming last. An uncured rubber formulation generally includes ethylenically unsaturated polymeric substances in combination with conventional vulcanization or curative additives. Included amongst such conventional additives are crosslinking agents such as sulfur, accelerators, tackifiers, antioxidants, and activators. The additives and polymeric rubber substances are usually admixed in a Branbury mixer and then formed into the desired thickness or shape of the footwear component parts. This is usually accomplished by milling, extruding, and calendering techniques, without curing the rubber formulation.

Vulcanization of the uncured footwear assembly alters the chemical and physical attributes of the rubber composition by crosslinking ethylenically unsaturated polymeric linkages. Crosslinking occurs not only within each of the individual assembled component parts, but also between ethylenically unsaturated polymeric linkages positioned at the interface of the adhesively overlapped component parts. This melds the component parts into a unitary, vulcanized product.

Heretofore, conventional manufacture of such rubber footwear products has required vulcanization of the entire footwear assembly. This requirement has placed severe constraints upon the rubber footwear manufacturing industry. Thermoplastic and other natural or synthetic polymeric substances thermally sensitive or degradable upon vulcanization are not acceptable for use in such a vulcanized product. Outsoles for such footwear products are essentially limited to vulcanized rubber outsoles. Such constraints have made it difficult for the rubber footwear industry to effectively compete against other footwear products capable of being produced in more fashionable designs (e.g. high heeled shoes, western boots, contrasting sole colors, etc.) at low cost. Manufacture of products such as footwear of a lightweight construction, replaceable or repairable soles, specialty soles adapted for specific uses (e.g. spiked, cleated, or ridged soles for sports such as golf, football, hiking, baseball, etc.) and products having other specialty wear features is not feasible using existing rubber footwear manufacture technology.

It would be desirable to incorporate many of the desirable attributes of such other, non-rubber footwear products into a footwear vulcanizate while retaining many of a vulcanizate's desirable attributes, such as resistance to air, gas, sunlight, hydrocarbons, moisture penetration, fats and oils, and acid and other chemicals, together with its excellent durability, strength, elasticity, electrical and heat insulating properties, and structural integrity. A different method of manufacturing rubber footwear products would be desirable if it could provide footwear products uniquely different in construction, utility and design from conventional rubber footwear. Vulcanized rubber footwear products able to separately receive an outsole would afford significant labor, equipment, production time and material savings. Notwithstanding a long felt need for such rubber footwear products, the manufacture of rubber footwear vulcanizates has remained essentially unchanged since the beginning of the 20th century.

Athletic sports footwear products (e.g. tennis shoes, etc.) generally differ from products of vulcanized rubber manufacture in that such sports footwear frequently include a polyurethane outsole. Such outsoles are normally incorporated into the athletic footwear product by injection molding. U.S. Pat. No. 4,245,406, by Landay, discloses a sport shoe having an outsole comprised of an injection molded polyurethane midsole to which a rubber outer sole is attached. Similarly, U.S. Pat. No. 4,455,765, by Sjosward, discloses a sport shoe product having an outsole with a polyurethane midsole and a rubber outer sole. A patent issued to Giese, U.S. Pat. No. 4,366,634, discloses an injection molded sport shoe, such as a tennis shoe, having a fabric upper portion secured to a sidewall and an outsole constructed of two different materials (preferably rubber and polyurethane midsole) to which a rubber outer sole is bonded. Another variation involving polyurethane shoe construction is disclosed by U.S. Pat. No. 4,228,600 by Kruge.

The Kruge shoe bottom comprises a flexible, closed-cell, crosslinked polyolefin foam having at least one surface of exposed open cells and an elastomeric polyurethane film which encompasses the foam.

A method for manufacturing a ski boot constructed of an upper part and a prefabricated sole is disclosed in U.S. Pat. No. 3,273,263 by Kilma. The prefabricated sole of the Kilma patent includes a metal plate adapted to receive notched nails or screws embedded within the sole. The sole is secured to the ski boot by means of glue and nails or screws. In another U.S. patent by Denu, U.S. Pat. No. 4,130,947, a method of making a sole is disclosed wherein a layered substance resistant to abrasion is vulcanized onto a dampening layer of a synthetic or natural rubber.

U.S. Pat. No. 2,983,643 by Seiberling discloses a heel ostensibly suitable for adaptation to footwear constructed from leather uppers. Seiberling mentions, at column 1, lines 25-32, the difficulties typically encountered when adhesively bonding a cured rubber heel to another surface. According to Seiberling, it is customary to abrade the skin surface of the cured rubber to roughen it. Otherwise, the cured skin becomes so slick that it does not form a good bond with the adhesive. The roughened surfaces of the cured rubbers may then be adhered to another surface by an adhesive. Seiberling proposes to avoid the need for roughening by incorporating cellulosic fibrous materials into that portion of the heel surface to the glued (e.g. by animal glue) onto the shoe. This involves placing an uncured or raw rubber biscuit with an overlying fibrous mat into a mold, then vulcanizing to form a heel vulcanizate having embedded cellulosic fibrous projections upon the glueing side.

A European patent specification by Phillips (Publication No. 0 075 861) further illustrates the problem with repairing leather footwear using thermosetting butadiene-styrene half soles. Phillips proposes to overcome this problem by imparting a pebbled surface texture onto the half sole. The pebbled surface reportedly enhances the adhesive properties of the sole and facilitates application of a hot melt adhesive thereto.

SUMMARY OF THE INVENTION

A footwear assembly according to the invention includes an uncured rubber upper, an uncured rubber insole mounted on the upper, and a midsole mounted on the insole. The midsole includes a midsole base and suitable means for securing the base to the insole, such as a vulcanizable rubber coating formed on the base. The midsole base is made of a prefabricated material which does not substantially undergo crosslinking and which retains its structural integrity during vulcanization. The exposed outer face of the midsole is disposed to receive an outsole. A vulcanized footwear assembly may thus be formed by vulcanizing such a footwear assembly, and a footwear product may then be completed by securing an outsole to the midsole. These and other aspects of the invention are described in detail hereafter.

BRIEF DESCRIPTION OF THE DRAWINGS

FIG. 5 is a perspective top view of a midsole shown in FIG. 1.

FIG. 6 is a cross-sectional view taken along line VI—VI of the FIG. 5 midsole.

FIG. 7 is a perspective bottom view of the outsole shown in FIG. 1.

FIG. 8 is a perspective bottom view of an insole overlapped with an uncured rubber upper upon a forming last in accordance with the invention.

DETAILED DESCRIPTION

Figure 1:
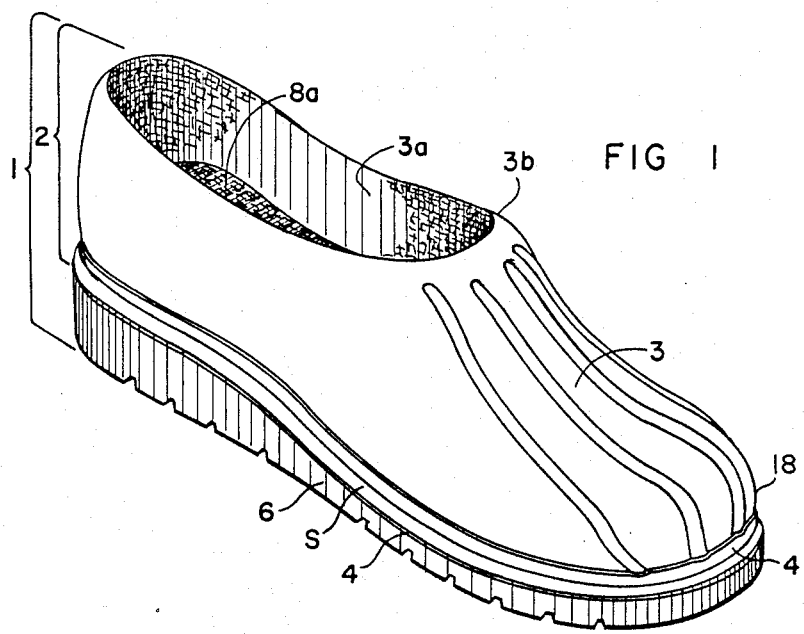
FIG. 1 is a perspective side view of a rubber footwear product manufactured in accordance with the present invention.

Referring to FIG. 1, the present invention provides a rubber footwear product 1 comprising a vulcanizate assembly 2 of unitary construction, which assembly 2 includes a rubber upper 3, a rubber insole 7 (occluded from view) and a rubber midsole (midsole base) 5, and an 6 separately secured to assembly 2. Vulcanizate assembly 2 further includes a rubber welt 4 which improves the footwear product. The intervulcanization of welt 4 with the other uncured rubber components as illustrated, namely rubber upper 3 and rubber midsole 5, significantly enhances the structural integrity, strength, water resistance and wear properties of the resulting vulcanized footwear product.

The present invention further provides a method for the manufacture of a rubber footwear product comprising vulcanizate assembly 2, which assembly 2 includes a rubber upper 3, insole 7 (see FIG. 2), rubber welt 4, and midsole 5, and an outsole 6 separately affixed to midsole 5 of vulcanizate assembly 2.

Figure 2:
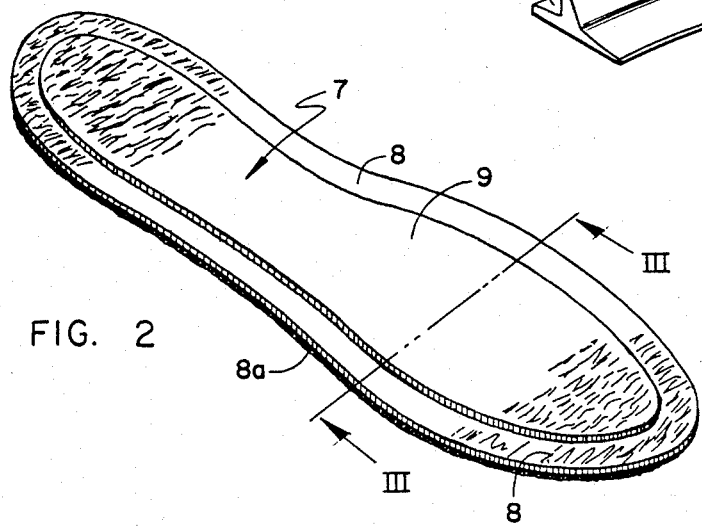
FIG. 2 is a perspective top view of an insole assembly according to the invention.
Figure 3:
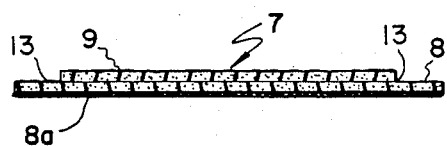
FIG. 3 is a cross-sectional view taken along line III—III of the FIG. 2 insole assembly.

The component parts and the method of manufacture of a footwear product according to the invention may be more fully appreciated by reference to FIGS. 2-12. FIG. 2 illustrates an insole 7 suitable for use in the manufacture of the the footwear products described herein. The illustrated insole 7 includes an insole base 8 and an insole filler 9 added for insulation and comfort purposes. Uncured rubber welt 4, further illustrated in FIGS. 10 and 12, fits into a step 13 formed between insole base 8 and insole filler 9. Welt 4 may then become part of vulcanizate assembly 2, or may be separately affixed to vulcanizate assembly 2. A welt 4 constructed of a material selected from plastic, including thermoplastics, rubber and other natural or synthetic materials, may be separately affixed (e.g. by an adhesive, sewing, etc.) to such a vulcanizate.

Figure 4:
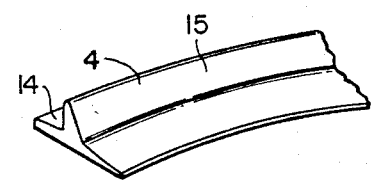
FIG. 4 is a fragmentary perspective view of a portion of an uncured rubber welt.
Figure 12:
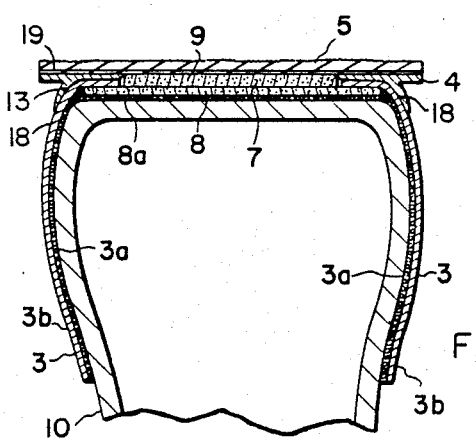
FIG. 12 is a cross-sectional view taken along line XII—XII in FIG. 11 showing the completed uncured assembly of the footwear product according to the invention.

The uncured welt 4 is advantageously T-shaped in cross-section or of a generally three-edged construction as shown, having a flat base 14 suitably designed to fit onto step 13 and an upright, elongated, generally centered ridge 15 which interfaces with rubber upper 3, as shown in FIG. 4. The internally disposed surfaces of welt 4 are preferably tapered to permit formation of a smooth, contoured vulcanized surface with midsole 5 and upper 3. Typically, rubber footwear vulcanizates do not include a rubber welt. The outer edge of welt 4 may be suitably designed to coincide with the outer periphery of midsole 5, as shown in FIG. 12. As shown in FIG. 6, both the bottom and top surfaces of midsole 5 have a plurality of macroscopic projections 17 which extend randomly outward from the surface of midsole 5. Outer sole 6, shown in FIG. 7, may be separately secured to midsole 5.

Figure 9:
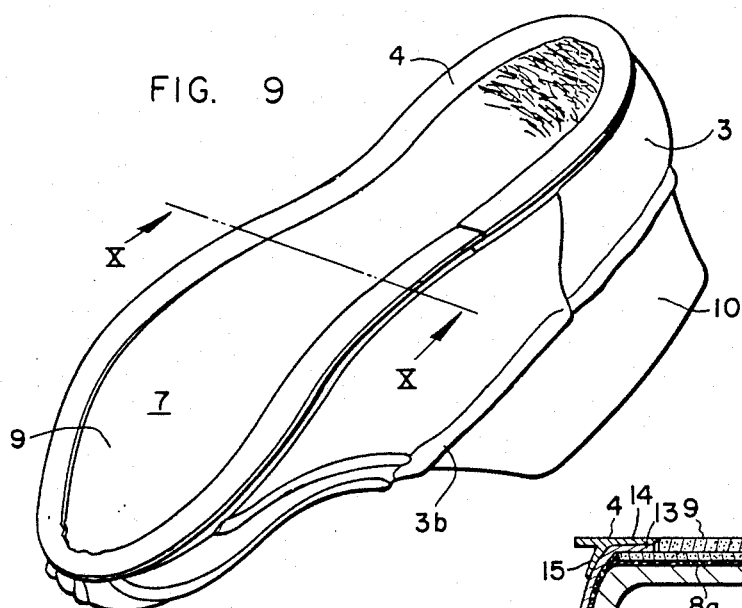
FIG. 9 is a perspective bottom view of an uncured rubber welt assembled onto the footwear assembly shown in FIG. 8.
Figure 10:
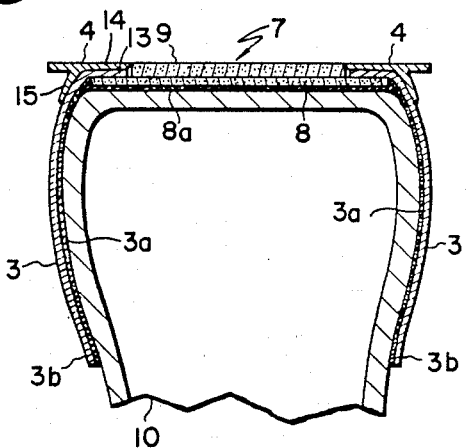
FIG. 10 is a cross-sectional view taken along line X—X of FIG. 9 which comprises a cross-sectional cut of the uncured upper, insole and welt upon a metal last.
Figure 11:
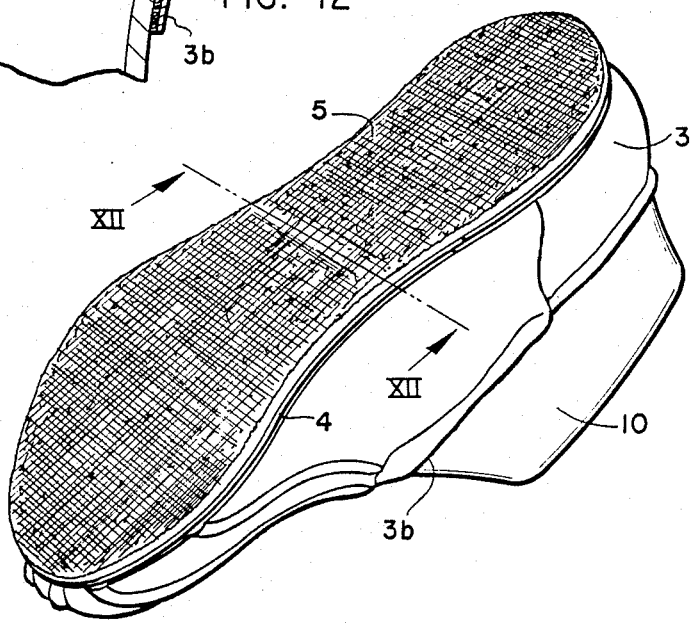
FIG. 11 is a perspective bottom view of the uncured assembly of FIG. 9 with the midsole attached thereto.

The manufacture of footwear product 1 may be suitably carried out, as shown in FIGS. 8-12, by adhesively overlapping an uncured rubber upper 3 with insole 7 at step 13 upon a forming last 10. The uncured rubber welt 4 may then adhesively overlap uncured rubber upper 3 and uncured rubber insole 7 on step 13 about the outer periphery of the shoe bottom, as illustrated in FIGS. 9 and 10. Thereafter, a vulcanized rubber midsole 5 is adhesively affixed to rubber welt 4 and insole 7 to provide an uncured assembly as shown in FIGS. 11 and 12. The uncured assembly may then be vulcanized to provide intermediate vulcanized footwear assembly 2 shown in FIG. 1. The rubber upper 3 shown in FIGS. 10 and 12 comprises a liner 3a and an uncured rubber outer portion 3b. Liner 3a serves to provide a more comfortable footwear product, but may, if desired, be omitted.

The interfacing components of vulcanizate assembly 2 may be appropriately constructed from a wide variety of natural and synthetic rubbers. Illustrative synthetic rubbers include the polymers of diethylenically unsaturated monomers alone or in combination with other conventional ethylenically unsaturated comonomers. Included amongst such ethylenically unsaturated monomers are the straight and/or branched chain diolefins such as isoprene, butadiene, chloroprene, diethylbutadiene, and mixtures thereof. Conjugated dienes are preferred. Copolymerized diethylenically unsaturated cyclic hydrocarbons such as bicyclo-heptadienes, substituted cyclic dienes (e.g. halogenated) and the like may also serve as monomers or comonomers. Other conventional ethylenically unsaturated comonomers may be suitably copolymerized with the diethylenically unsaturated comonomers (especially with conjugated dienes) to impart certain desirable attributes to the synthetic rubber. Included amongst such comonomers are the lower alkenes (e.g. $C_1$-$C_4$ olefins such as ethylene, propylene, and isobutylene), styrene and styrene derivatives, acrylonitrile, acetylene, and other comonomers conventionally copolymerized with dienes in the manufacture of synthetic rubbers. Illustrative of such synthetic rubbers are butyl rubber (isobutylene/isoprene copolymers), cis-polyisoprene, neoprene (e.g. neoprene/acetylene copolymers), Buna N (e.g. butadiene/acrylonitrile copolymers), ethylene, polypropylene/neoprene and butadiene/bicycloheptadiene copolymers, and mixtures thereof.

Pursuant to the present invention, midsole 5, as depicted in FIGS. 5 and 6, is especially adapted for intervulcanization with the other uncured rubber footwear components and affords a base (support surface) for separately securing the outer sole 6 thereto. The invention departs from conventional rubber footwear manufacture not only by the nature and character of midsole 5, but also by its use in the construction of a rubber vulcanizate. The dimensional size and shape of midsole 5 are advantageously designed to provide a base for supporting outsole 6. Midsole 5 can be incorporated into vulcanizate assembly 2 so that it extends outwardly beyond a base 18 of rubber upper 3 as illustrated in FIGS. 1, 11 and 12. Heretofore, such a midsole construction and appearance were commonly incorporated into leather footwear products, but were inapposite to rubber vulcanizate manufacture. The outer edge of midsole 5 may be suitably cut to substantially coincide with the outer edge of the assembled welt 4. Midsole base 5 should be constructed of a material capable of withstanding the relatively high temperatures needed to vulcanize the uncured rubber assembly illustrated in FIGS. 11 and 12 into vulcanizate assembly 2, shown in FIG. 1, having a unitary construction.

Midsole 5 must be able to withstand the vulcanization conditions needed to cure the uncured rubber components into a vulcanizate without any appreciable deformation of the size, shape, function or construction of midsole 5, that is, without melting, shrinkage and other physical or chemical decomposition or deterioration. Certain polymeric substances such as thermoplastics which melt, deform or fail to retain their structural integrity under vulcanization conditions are unsuitable midsole materials. Thermoplastics possessing sufficiently high resistance to melting and deterioration at or above vulcanization temperatures, such as certain high molecular weight thermoplastic materials (e.g. thermoplastic rubbers or thermoplastics formulated with certain melt retarding additives or comonomers to prevent or inhibit thermal deformation or decomposition, may be used to make midsole 5.

Crosslinked polymeric materials which are resistant to thermal deformation and decomposition under vulcanization conditions, which may be coated with an uncured rubber at the midsole surface which interfaces with the other uncured rubber components of the assembly, and which permit midsole 5 to be intervulcanized therewith into a vulcanizate of unitary construction may also be used to make midsole 5. Rubber vulcanizates, including those formulated with fillers, are especially well adapted for use as a midsole base material. Filled rubber vulcanizates may be prepared by uniformly admixing together, for example, in a Branbury mixer, an uncured rubber and filler or precursors thereof along with the other desired conventional vulcanization additives, and then forming the mixture by calendering, extruding, or molding under vulcanizing conditions into a vulcanizate composite of the desired midsole thickness. The preformed vulcanizate may be milled, cut or stamped into the desired size and configuration of the midsole component.

The vulcanizate composite may contain a particulate filler embedded and uniformly distributed throughout the vulcanizate structure. Fibrous materials or fibrous precursors derived from a variety of sources may be used as such a filler, including natural, synthetic and fibrous particulate substrates which are organic or inorganic. The following substances are exemplary of such fibrous source materials: animal or proteinaceous fibrous substances such as leather dust, silk, hair, and wool; vegetable or cellulosic materials such as cotton, flax, hemp, and jute; grain fibers or pulp such as fibers or pulp of wheat, oat, bran, corn, soybean, and cottonseed; wood fibers or pulp; regenerated fibrous materials such as cellulose and proteinaceous materials; synthetic fibers such as cellulose acetate; acrylic fibers such as polyacrylonitrile; vinyl chloride/acrylonitrile copolymers; inorganic or mineral substances such as asbestos;

and mixtures thereof. Cellulosic pulps such as those obtained from vegetative pulpy substances are a particularly suitable fibrous source material. Wood fibers such as wood flour, sawdust, and buffer dust are especially well suited as a filler.

The vulcanized midsole 5 should be treated as described hereafter on at least one face, and preferably on both faces to enhance bonding of midsole 5 with the other components. The inner midsole face which interfaces with the internally disposed portions of vulcanizate assembly 2 should be chemically and/or mechanically treated to permit the application and adherence thereto of an uncured rubber coating 19. Chemical treatments which permit an uncured rubber coating 19 to wet and adhere to midsole 5, such as treatment with chlorinating acids, may be used for this purpose. Similarly, roughing or abrading the midsole provides a suitable surface for coating the midsole face with an uncured rubber. As illustrated in FIG. 6, such roughening tends to create a multiplicity of macroscopic projections 17 which are firmly anchored within the adjoining vulcanizate matrix. Such pretreatment permits the impregnating and coating of the midsole inner surface 20 with an uncured rubber substrate. Thus, the coated inner midsole surface may thereby be intervulcanized with the other uncured components into a unitary rubber vulcanizate.

A similarly treated outer midsole surface (e.g. roughened or abraded) affords the means whereby an outer sole may be separately affixed to the vulcanizate assembly 2. Abrading with a wire brush, a coarse emery wheel or coarse sandpaper (e.g. 60–80 grit) lengthwise and crosswise may be used effectively as a pretreatment for both of these surfaces. A milled rubber composite manufactured and distributed by Monarch Rubber Co., Baltimore, Md. known as 1541 Apollo milled to a thickness ranging from about 2 to about 4 mm (preferably about 3 mm) and abrasively surface treated lengthwise and crosswise has been found particularly effective for mating midsole 5.

Midsole 5 cannot, by itself, be intervulcanized with the other component parts of assembly 2. Coating the internal surface of midsole 5 (i.e., the surface facing welt 4 and insole 7) with uncured rubber coating 19 will typically impart sufficient adhesive tack to permit adhesive bonding of midsole 5 to the uncured rubber footwear assembly depicted in FIGS. 11 and 12, while providing a substrate which will intervulcanize with the other uncured footwear components to provide a unitary vulcanized product. Although the thickness of coating 19 may vary, a coating of less than about 25 Mil. (i.e. 0.025 inch) thickness and most typically less than 15 Mil. (e.g. about 5 to about 10 Mil.) will generally be sufficient to permit the midsole to be intervulcanized with the interfacing components.

A satisfactory uncured rubber coating 19 upon midsole 5 may be most effectively created by a two stage coating process. The first stage may be suitably effectuated by initially coating the midsole vulcanizate base 5 with an uncured rubber latex. This is followed by a second coat or overcoat of an uncured rubber solution. Such a two stage coating process tends to significantly improve the wetting, penetration and tenacity of the uncured rubber to midsole 5, and the ultimate structural integrity of the vulcanizate.

The uncured rubber latex may typically comprise an uncured natural or synthetic rubber uniformly dispersed throughout a polar dispersant such as water. Such latexes are typically formulated with conventional emulsifiers or surfactant systems (natural or synthetic) for emulsifying finely divided or minute uncured rubber particles throughout an aqueous carrier, along with wetting agents, crosslinking agents (e.g. sulfur), tackifiers and other conventional curable rubber latex additives. Conventional lower alkyl alcohols (e.g. ethanol, propanol, etc.) are frequently added to enhance the wetting and penetration of the uncured rubber molecules and curing reagents into the porous interstices of midsole 5. A commercially available natural rubber latex sold as Northwest Latex 3003 (neutral), manufactured and distributed by Northwest Coating Co., Oak Creek, Wis., has been found to be particularly effective as a latex coating. Conventional coating techniques such as spraying, brushing, or dipping may be used to uniformly apply the latex to the inner surface of midsole 5. The volatile carrier (namely water) may then be removed by conventional drying techniques including air, oven, or vacuum drying conducted below the uncured rubber vulcanization temperature. The dry latex coating will form an uncured rubber film upon the inner surface of midsole base 5.

An uncured rubber solution or non-polar dispersion may then be applied onto the dry latex coating. Such uncured rubber solutions or dispersions typically include a suitable rubber solvent or non-polar dispersant, an uncured rubber component uniformly dissolved or dispersed therein, plus crosslinking reagents, accelerators, wetting agents and other conventional curative additives. Solvents such as gasoline, benzene, chloroform, carbon tetrachloride, and carbon disulfide tend to swell uncured and cured rubbers. These solvents may be effectively utilized to enhance the penetration of the uncured rubber solution and vulcanizate reagents into the dry latex coating of midsole 5, and to provide a more uniform coating of the uncured rubber upon the surface of midsole 5. An illustrative uncured rubber solution (preferably of a high bond strength and excellent relaxation properties) may be conveniently prepared by uniformly admixing, in a cement churn, an uncured rubber stock, isopropyl alcohol as a wetting agent, sulfur, hexane and heptane as cosolvents, and other conventional rubber curative additives (e.g. accelerators, activators, anti-oxidants, tackifiers, etc.) in conventional concentrations. The uncured rubber solution may then be applied to the dry latex precoat by conventional techniques such as those mentioned above for applying the latex coating. After the uncured rubber solution has been applied, excess solvent may be removed therefrom by conventional means such as vacuum, air r oven drying.

The uniformly coated vulcanizate midsole base 5 precoated with a dry latex and a solvent overcoat of curable rubber provides an uncured rubber base which readily intervulcanizes with the other uncured component parts into a unitary vulcanizate assembly. The precoated midsole thus described may be used to prepare the uncured footwear assembly illustrated in FIGS. 11 and 12. As is characteristic of uncured rubber stock, the uncured coating lamina may be adhesively affixed to the adjacently positioned uncured welt 4 and filler 9 of insole 7 upon the last 10. The uncured assembly illustrated in FIGS. 11 and 12 may then be vulcanized. Vulcanization causes a melding together of uncured rubber components, including uncured rubber coating 19, into unitary vulcanizate assembly 2. The interfaces between the component parts are chemically altered into a unitary vulcanizate. Coating of the outwardly facing face 22 of midsole 5 is generally inadvisable unless it is desired to separately apply a rubber outsole (e.g. for specialty soles such as for golf shoes, running shoes, etc.) thereto, in which case the uncured rubber coating therefor would be applied after vulcanizate assembly 2 is made.

Vulcanizate assembly 2 of this invention differs from conventional vulcanized rubber footwear by the inclusion of midsole 5. Unlike the flexible and internally disposed binders or fillers often used in rubber vulcanizates as an internal interfacing component with the outsole, a portion of midsole 5 can be designed as an externally exposed component of the assembled footwear product 1.

In the preferred embodiments of the invention, midsole 5 provides an interfacing surface substantially the same in size, shape and surface area as the separately secured outsole 6. The contour of outer surface 22 of midsole 5 may suitably match the contour of the inner interfacing surface of outsole 6 to provide a firm base therefor. Preferably, outer surface 22 of midsole 5 will be substantially flat, and cut to match the outer periphery of outsole 6.

The present invention permits vulcanizate assembly 2 to be combined with a multiplicity of outer sole types. An intermediate vulcanizate article without an outer sole may be initially manufactured, and a specialty outer sole or fashion outer sole may then be separately secured thereto. The unique constructions and method of manufacture according to the invention allow production of vulcanized footwear products having a diverse variety of soles. Substantial inventory and shipping cost savings may be realized by use of a vulcanized footwear assembly adapted to separately receive an outer sole. The vulcanized assembly may be conveniently shipped from the manufacturing site to distant distributing sites, at which the desired outer sole may be secured.

The outer midsole surface may be treated with the latex precoat and uncured rubber solution overcoat in the same manner as the inner midsole surface described previously to permit an uncured outer sole to be affixed thereto by vulcanization. Alternatively, an outer sole vulcanizate of a similar composition and construction as the midsole base may be coated with an uncured rubber as defined herein and intervulcanized therewith to provide the desired completed footwear product. The outer sole 6 may be secured to the vulcanized base footwear assembly 2 by an injection molding process wherein a molten mass of an uncured rubber base, thermoset plastic or thermoplastic material is injected into a forming mold bearing the desired outer sole configuration onto vulcanizate assembly 2. The material is then cooled to provide an outer sole 6 securely affixed to assembly 2. A multitude of outer soles differing in color, design and function may thereby be firmly secured to vulcanizate assembly 2. The present invention obviates the need for manufacturing the completed footwear product in a single vulcanization step as is necessary with conventional processes for manufacturing vulcanized rubber footwear.

Another important attribute of the present invention is its ability to allow an outsole to be adhesively applied to the vulcanized base footwear product. A multiplicity of outer soles of different compositions can be adhesively secured to midsole 5 of vulcanizate assembly 2. The pretreated outer surface of midsole 5, as mentioned above, affords a secure base for applying an adhesive composition to the midsole surface and for firmly affixing or anchoring outer sole 6 to vulcanizate assembly 2. In contrast to conventional rubber footwear vulcanizates which are normally discarded when the outer sole becomes worn and unfit for further use, the present footwear products can be repaired by simply replacing the worn outer sole with a new outer sole. The present invention can also provide a unitary vulcanizate assembly 2 comprising a cured rubber upper, rubber insole, rubber welt and midsole in combination with an outer sole of a different composition securely affixed thereto. Rubber footwear products of a lighter weight, embodying significant advances in style, design and utility, are made possible by this aspect of the invention.

Outsoles made from a variety of natural and synthetic materials may be used in footwear products 1 according to the present invention. Vulcanizate assembly 2 may be secured to a wide variety of soles presently used in the construction of other footwear products, many of which are unfit for use in conjunction with conventional vulcanized rubber footwear products. Outer sole 6 may be made from naturally occuring materials such as natural rubber crepe and leather, as well as synthetic thermoplastic or thermoset plastics such as polyurethane, ethyl vinyl acetate, polyolefins, polyvinylchloride, thermoset and/or thermoplastic foams (e.g. macroscopic and micro-cellular) of an open or closed cellular construction, and combinations thereof. The present invention affords a means for substantially reducing overall footwear weight because outsole 6 need not be made from vulcanized rubber, which has a specific gravity normally within the range of 1.2–1.3 depending upon additives. An outsole 6 having a specific gravity significantly less than a cured rubber, e.g. 0.8, particularly less than about 0.6, as well as foamed outsoles having a specific gravity less than about 0.5 (often less than about 0.4) may be affixed to vulcanizate assembly 2.

The most appropriate adhesive for securing outsole 6 to midsole 5 will depend upon the composition and adhesive compatibility of the interfacing surface of outsole 6 with the adhesive. The composition and construction of midsole 5 is generally compatible with a broad range of adhesives commonly used to secure outsoles in conventional shoe manufacture and repair. Exemplary adhesives include thermoplastic hot melts, contact cements, polyurethane cements, epoxy resins, animal glues, rubber cements (e.g. neoprene cements), and mixtures thereof. Neoprene and polyurethane cements have been found particularly effective for rigidly and permanently securing an outsole 6 to midsole 5.

What is claimed is:

1. A footwear assembly, comprising:
    an uncured rubber upper;
    an uncured rubber insole mounted on said upper;
    a midsole mounted on said insole, said midsole including a midsole base and means for securing said base to said insole, said base consisting essentially of a prefabricated material which is substantially non-crosslinkable and which retains its structural integrity during vulcanization of said upper and said insole, and which has an exposed outer face disposed to receive an outsole thereon.

2. The footwear assembly of claim 1, wherein said means comprises a vulcanizable coating formed on said face of said base and disposed for intervulcanization with said insole.

3. A vulcanized footwear assembly, comprising:

a rubber upper;

a substantially flat, rubber insole overlapping said upper at mutually superposed edge portions of said upper and said insole, said insole having an inner face facing said upper and an outer face opposite said inner face;

a midsole superposed on said outer face of said insole, said midsole having an outer face shaped to receive an outer sole thereon in face-to-face contact therewith; and a layer of vulcanized rubber securely adhered to an inner face of said midsole, wherein said vulcanized rubber layer, said upper and said insole having been intervulcanized to form a unitary structure, said midsole is made of a prefabricated material consisting essentially of vulcanized rubber having a particulate, fibrous filler substantially uniformly distributed therein, and said midsole is secured to said unitary structure by means of said rubber layer.

4. The vulcanized footwear assembly of claim 3, wherein wherein and midsole consists essentially of a cross-linked polymeric material.

5. The vulcanized footwear assembly of claim 3, further comprising a welt interposed between said upper and said rubber layer around the outer periphery of said insole, and secured to said rubber layer and said upper, said welt comprising a flat base having a central ridge, and inner face of said ridge being in face-to-face contact with said edge portion of said upper, and a bottom face of said base on the opposite side thereof from said ridge being in face-to-face contact with said rubber layer.

6. The vulcanized footwear assembly of claim 5, wherein said insole comprises a base and a geometrically similarly shaped filler superposed thereon, said base extending beyond the periphery of said filler to define a step, said edge portion of said upper and said base of said welt being disposed on said step between said midsole and said insole base.

7. The vulcanized footwear assembly of claim 6, wherein inner edges of said upper and said welt adjoin an outer peripheral edge of said filler.

8. The vulcanized footwear assembly of claim 3, wherein said midsole consists essentially of a thermoplastic material which is resistant to deformation and degradation under vulcanization conditions.

9. The vulcanized footwear assembly of claim 3, wherein said filler consists essentially of a fibrous material selected from the group consisting of cellulosic pulps and wood fibers.

10. The vulcanized footwear assembly of claim 3, wherein said rubber layer has a thickness of less than about 0.025 inch.

11. The vulcanized footwear assembly of claim 3, wherein said rubber is selected from the group consisting of natural rubbers, polymers of diethylencially unsaturated straight or branched chain deiolefin or cyclic hydrocarbon monomers, and copolymers of said diethylenically unsaturated monomers and $C_1$–$C_4$ olefins, substituted and unsubstituted styrene comonomers, acrylonitrile, and acetylene comonomers.

12. A vulcanized footwear assembly comprising:

a rubber upper;

a substantially flat, rubber insole overlapping said upper at mutually superposed edge portions of said upper and insole, said insole having an inner face facing said upper and an outer face opposite said inner face;

a midsole superposed on said outer face of said insole, said midsole having an outer face shaped to receive an outer sole thereon in face-to-face contact therewith; and a layer of vulcanized rubber securely adhered to an inner face of said midsole, wherein said rubber layer has ben formed by first coating said inner face of said midsole with an uncured rubber latex, then coating the thus-formed latex layer with a coating of an uncured rubber solution or dispersion, and said rubber layer, said upper, and said insole have been intervulcanized to form a unitary structure, and wherein said midsole is made of a prefabricated material which is non-crosslinkable and which retains structural integrity during said intervulcanization of said rubber layer, said upper, and said insole, and is secured to said unitary structure by means of said rubber layer.

13. The vulcanized footwear assembly of claim 12, wherein said rubber latex comprises an uncured rubber dispersed in a polar liquid in the presence of an emulsifier or surfactant, and said uncured rubber solution or dispersion comprises an uncured rubber dissolved or dispersed in a non-polar liquid.

14. The vulcanized footwear assembly of claim 13, wherein said rubber latex contains an amount of a wetting agent effective to enhance adhesion of said rubber latex to said midsole.

15. The vulcanized footwear assembly of claim 14, wherein said wetting agent is a lower alkyl alcohol.

16. The vulcanized footwear assembly of claim 13, wherein said polar liquid is water, and said non-polar liquid is an organic liquid which tends to swell uncured and cured rubbers.

17. The vulcanized footwear assembly of claim 16, wherein said organic liquid is selected from the group consisting of gasoline, benzene, chloroform, carbon tetrachloride, and carbon disulfide.

* * * * *